(12) United States Patent
Wu et al.

(10) Patent No.: US 12,417,258 B2
(45) Date of Patent: Sep. 16, 2025

(54) PARAMETER SETTING METHOD AND DEVICE FOR ANODIC DYEING PROCESS, AND ELECTRONIC DEVICE

(71) Applicant: Fulian Yuzhan Precision Technology Co., Ltd., Shenzhen (CN)

(72) Inventors: Chen-Ting Wu, New Taipei (TW); Xin-Di Lei, Shenzhen (CN); Hong-Wei Zhang, Zhengzhou (CN); Deng-Kui Tian, Shenzhen (CN); Ying-Ying Nie, Shenzhen (CN); Cheng-Lun Lee, New Taipei (TW); Qing-Yu Wang, Shenzhen (CN)

(73) Assignee: Fulian Yuzhan Precision Technology Co., Ltd., Shenzhen (CN)

( * ) Notice: Subject to any disclaimer, the term of this patent is extended or adjusted under 35 U.S.C. 154(b) by 457 days.

(21) Appl. No.: 17/969,426

(22) Filed: Oct. 19, 2022

(65) Prior Publication Data

US 2023/0161842 A1 May 25, 2023

(30) Foreign Application Priority Data

Nov. 24, 2021 (CN) .......................... 202111399282.3

(51) Int. Cl.
*G06N 20/00* (2019.01)
*G05B 13/02* (2006.01)
*G06F 18/21* (2023.01)

(52) U.S. Cl.
CPC ......... *G06F 18/217* (2023.01); *G05B 13/024* (2013.01); *G06N 20/00* (2019.01)

(58) Field of Classification Search
CPC .... G06F 18/217; G06F 18/23; G06F 18/2433; G06F 18/27; G06F 18/214; G06F 18/24;
(Continued)

(56) References Cited

U.S. PATENT DOCUMENTS

2007/0282766 A1* 12/2007 Hartman ................ G06N 20/10
706/15
2014/0136146 A1* 5/2014 McCready ......... G05B 23/0254
702/179
(Continued)

FOREIGN PATENT DOCUMENTS

| CN | 104573864 | 4/2015 |
| CN | 111209609 | 5/2020 |
| CN | 113255216 | 8/2021 |

OTHER PUBLICATIONS

Kim et al. "Feasibility of Machine Learning Algorithms for Predicting the Deformation of Anodic Titanium Films by Modulating Anodization Processes"; Feb. 2021 Online URL:<https://pmc.ncbi.nlm.nih.gov/articles/PMC7956670/pdf/materials-14-01089.pdf> (Year: 2021).*

(Continued)

*Primary Examiner* — Chad G Erdman
*Assistant Examiner* — Jonathan Michael Skrzycki
(74) *Attorney, Agent, or Firm* — ScienBiziP, P.C.

(57) ABSTRACT

A parameter setting method acquires historical processing data, pre-processes the historical processing data to obtain sample data, and creates a trained regression algorithm using the sample data, then acquires preliminary emulated processing data and predetermined objective parameters inputted, wherein the preliminary emulated processing data and the predetermined objective parameters constitute emulated processing data. A reinforcement learning algorithm is trained with the historical processing data, emulated processing data, and the reinforcement learning algorithm; an actual objective parameter are set according to the actual reference parameters and the reinforcement learning algorithm. Scale of the training data for the reinforcement learning algorithm is greatly increased by the trained regression algorithm, which improves the accuracy of the learning (Continued)

algorithm. A parameter setting device, an electronic device, and a storage medium are also disclosed.

18 Claims, 5 Drawing Sheets

(58) Field of Classification Search
CPC .... G05B 13/024; G05B 13/027; G06N 20/00; G06N 3/04; G06N 3/044; G06N 3/088; G06N 3/006; G06N 3/045; G06N 3/08; G06N 3/084; G06N 3/126; G06N 5/01; G06N 7/01
See application file for complete search history.

(56) References Cited

U.S. PATENT DOCUMENTS

| | | | | |
|---|---|---|---|---|
| 2020/0166909 | A1* | 5/2020 | Noone | G06N 20/00 |
| 2020/0383224 | A1* | 12/2020 | Curran | C25D 11/243 |
| 2021/0049460 | A1* | 2/2021 | Ahn | G06N 3/047 |
| 2021/0200749 | A1* | 7/2021 | Sghiouer | G06F 16/215 |
| 2022/0114490 | A1* | 4/2022 | Das | G06N 3/088 |
| 2022/0291642 | A1* | 9/2022 | McClement | G06N 3/08 |

OTHER PUBLICATIONS

Vagaska et al. "Modeling of the anodizing process of aluminum using neural networks" 2014 Online URL:<https://ieeexplore.ieee.org/stamp/stamp.jsp?tp=&arnumber=6843681> (Year: 2014).*
Merriam-Webster dictionary, definition of Emulate, 2025, Online URL:<https://www.merriam-webster.com/dictionary/emulate> (Year: 2025).*

* cited by examiner

PARAMETER SETTING METHOD AND DEVICE FOR ANODIC DYEING PROCESS, AND ELECTRONIC DEVICE

CROSS-REFERENCE TO RELATED APPLICATIONS

This application claims priority to China Application No. 202111399282.3, having a filing date of Nov. 24, 2021, filed in China State Intellectual Property Administration, the entire contents of which are hereby incorporate by reference.

FIELD

The subject matter relates to material processing technologies, and more particularly, to a parameter setting method, a parameter setting device, and an electronical device.

BACKGROUND

During processing of materials, results of processes applied to materials is affected by various processing parameters. For example, in laser welding process, the welding quality is affected by factors such as temperature, material properties, and welding time. In anodic dyeing process, the dyeing results are affected by factors such as time duration of dyeing, concentration of dyeing solution, temperature, and pH value of anodizing tank. To ensure satisfactory results of processes applied to the materials, it is often necessary to adjust the parameters manually based on staff experiences, which is cumbersome and imprecise.

For example, in anodic dyeing process, if the color measurement of the dyed material is not qualifying, it is necessary to determine duration of secondary dyeing according to the dyeing extent of the material and processing parameters of the anodizing tank, such as temperature, pH value, concentration, etc. The duration of secondary dyeing of the existing materials is mostly set manually, and it takes a lot of time to do many tests and adjustments for ensuring a qualified color. In addition, the parameters determined by manual experience need heavy labor costs, and have a poor reproducibility of such adjustments.

SUMMARY

In order to achieve the purpose, a parameter setting method, a parameter setting device, and an electronical device are provided to determine an appropriate processing parameter, which improves efficiency of adjusting the processing parameters and the yield rate, the technical solutions of the present disclosure are as follows:

An aspect of the present disclosure provides a method for setting parameters comprising: acquiring historical processing data from previous products finished by any manufacturing process, the historical processing data comprising a historical objective parameter and a plurality of historical reference parameters; pre-processing the historical processing data to obtain sample data; creating a trained regression model using the sample data; obtaining preliminary emulated processing data by using the regression model, the preliminary emulated processing data comprising a preliminary objective parameter and a plurality of preliminary reference parameters; receiving a predetermined objective parameter inputted by a user; adjusting the preliminary objective parameter according to the predetermined objective parameter to obtain an emulated objective parameter, the preliminary reference parameters and the emulated objective parameter cooperatively constituting emulated processing data; training a reinforcement learning algorithm by using the historical processing data and the emulated processing data; obtaining actual reference parameters;

determining an actual objective parameter according to the actual reference parameters and the trained reinforcement learning algorithm.

Therefore, the sample data is obtained from the historical processing data and being used for training the regression model, the trained regression model can be used to obtain the preliminary reference parameters, then the emulated processing data can be obtained according to the preliminary reference parameters, the reinforcement learning algorithm can be trained by the historical processing data and the emulated processing data, wherein the scale of the historical data can be increased by the trained regression model and the accuracy of the reinforcement learning algorithm can be improved.

Preferably, the step of obtaining preliminary emulated processing data by using the regression model further comprises: the preliminary objective parameter is obtained according to the regression model and the historical reference parameters, and the historical reference parameters are set as the preliminary reference parameters.

Preferably, the step of obtaining preliminary emulated processing data by using the regression model further comprises: the preliminary objective parameter is obtained according to the regression model and the historical reference parameters, the historical reference parameters are set as the preliminary reference parameters.

Preferably, the step of obtaining preliminary emulated processing data by using the regression model further comprises: first preliminary objective parameter is obtained according to the regression model and the historical reference parameters, the historical reference parameters are set as first preliminary reference parameters; second preliminary objective parameter is obtained according to the regression model and updated reference parameters, the first emulated reference parameter and the updated reference parameters are set as the preliminary reference parameters, the first preliminary objective parameter and the second preliminary objective parameters are set as the preliminary objective parameters.

Preferably, the step of creating the trained regression model using the sample data further comprises: classifying the sample data according to an unsupervised clustering algorithm to obtain multiple sub-sample datasets; creating a regression model for each sub-sample dataset using a supervised learning process and the data of multiple sub-samples.

Preferably, the step of obtaining preliminary emulated processing data by using the regression model further comprises: obtaining preliminary reference parameters of the preliminary emulated processing data and calculating similarities between the preliminary reference parameters and the multiple sub-sample datasets; selecting the regression models corresponding to the sub-sample datasets according to the similarities; obtaining the preliminary objective parameter according to the preliminary reference parameters and the sub-sample datasets, the preliminary objective parameter and the preliminary reference parameters cooperatively constituting the preliminary emulated processing data.

Preferably, the pre-processing comprises screening by at least one of a low variance filter, a high correlation filter, and an F_regression.

Preferably, the step of adjusting the preliminary objective parameter according to the predetermined objective parameter to obtain an emulated objective parameter further comprises: acquiring preliminary processing results corresponding to the preliminary objective parameter; acquiring suggested processing results corresponding to the predetermined objective parameter; determining a correction coefficient 'a' according to formula a=(predetermined objective parameter*preliminary processing result)/(preliminary objective parameter*suggested processing result); calculating the emulated objective parameter according to formula the emulated objective parameter=a*preliminary objective parameter.

Preferably, each of the historical reference parameters and the preliminary reference parameters comprises processing parameters and resulting parameters, the step of training a reinforcement learning algorithm further comprises: determining a state space according to the processing parameters of the historical reference parameters and the preliminary reference parameters; determining an action space according to the historical objective parameter and the emulated objective parameter; determining ranges of threshold values according to the resulting parameters of the historical reference parameters and the preliminary reference parameters; determining a weight of each range of the threshold values and determining a reward space according to the weight of each range; determining a trained reinforcement learning algorithm according to the state space, the action space, and the reward space.

Preferably, the historical processing data, the preliminary emulated processing data, and the emulated processing data are associated with anodic dyeing procedures; the historical reference parameters, the preliminary reference parameters, and the actual reference parameters are parameters associated with the anodic dyeing procedures; the historical objective parameter, the preliminary objective parameter, and the actual objective parameter are associated with time duration of dyeing.

Preferably, the anodic dyeing parameter data comprises a concentration of dyeing solution, a temperature, a pH value, and a yield rate of the anodizing tank;

According to a second aspect of the present disclosure, a device for setting parameters is provided, comprising:
- a communicator configured for acquiring historical processing data, the historical processing data comprising a historical objective parameter and a plurality of historical reference parameters;
- a processor coupling to the communicator, the processor is configured for: pre-processing the historical processing data to obtain sample data; creating a trained regression model using the sample data; obtaining preliminary emulated processing data by using the regression model, the preliminary emulated processing data comprising a preliminary objective parameter and a plurality of preliminary reference parameters; receiving a predetermined objective parameter inputted by a user; adjusting the preliminary objective parameter according to the predetermined objective parameter to obtain an emulated objective parameter, the preliminary reference parameters and the emulated objective parameter cooperatively constituting emulated processing data; training a reinforcement learning algorithm by using the historical processing data and the emulated processing data; obtaining actual reference parameters; determining an actual objective parameter according to the actual reference parameters and the trained reinforcement learning algorithm.

According to a third aspect of the present disclosure, an electronic device is provided, comprising: a memory for storing instructions; and a processer for calling up the instructions in the memory to cause the electronic device to perform the parameter setting method above.

According to a fourth aspect of the present disclosure, a computer readable storage medium for storing computer readable instructions, wherein the computer readable instructions are executed by a processor to perform the parameter setting method described above.

BRIEF DESCRIPTION OF THE DRAWINGS

Implementations of the present technology will now be described, by way of example only, with reference to the attached figures.

DETAILED DESCRIPTION

Figure 1:
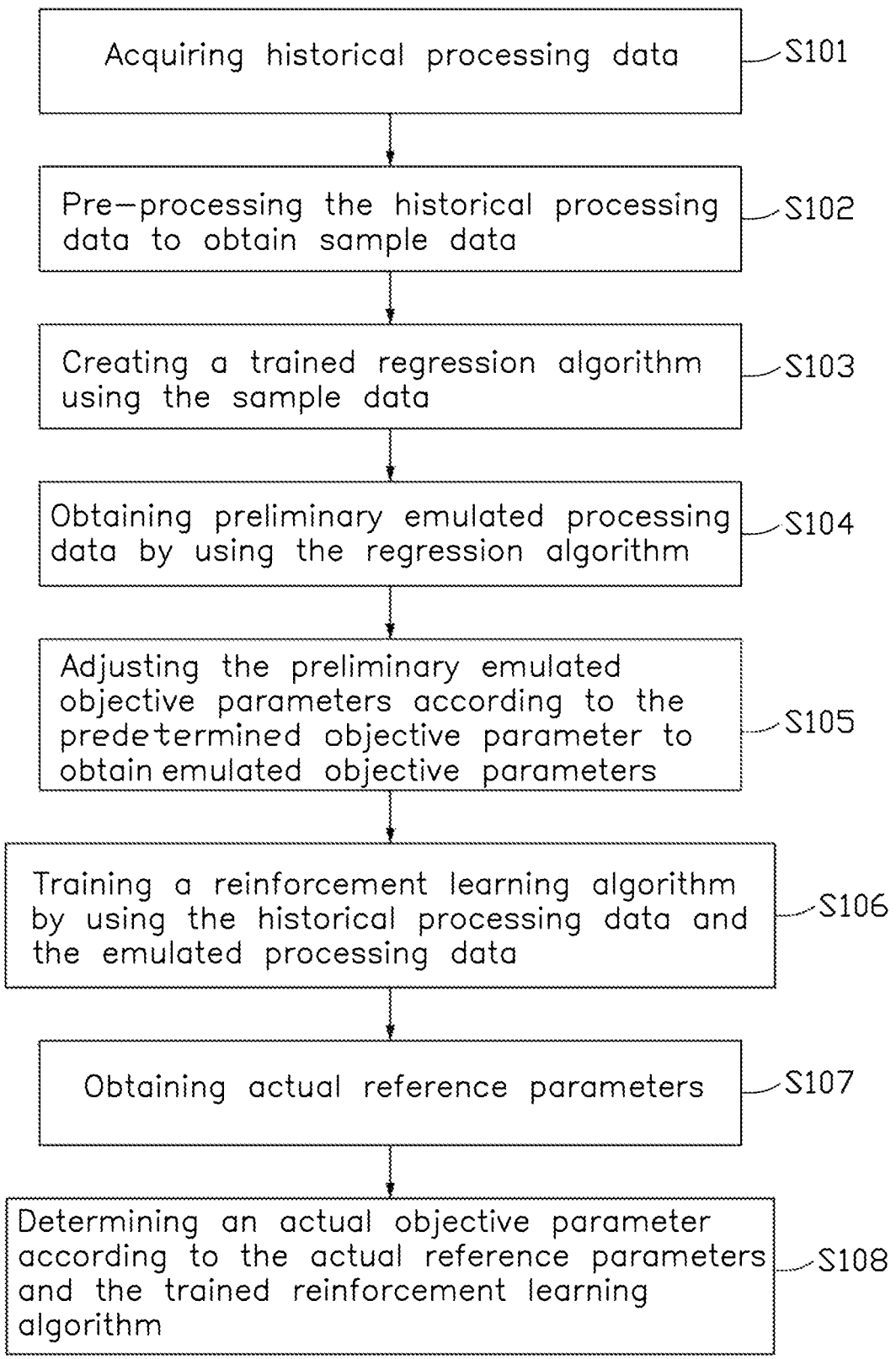
FIG. 1 is a flow diagram of a parameter setting method according to an embodiment of the present disclosure.

It will be appreciated that for simplicity and clarity of illustration, where appropriate, reference numerals have been repeated among the different figures to indicate corresponding or analogous components. The description is not to be considered as limiting the scope of the embodiments described herein. The drawings are not necessarily to scale and the proportions of certain parts may be exaggerated to better illustrate details and features of the present disclosure.

It should be understood that, the terms "first" and "second" are used to distinguish between elements and are not used to denote a particular order or imply a number of technical features, therefore, unless specifically defined, features described as "first" and "second" may expressly or implicitly include one or more of the stated features. In the description of the present application, "plurality" means two or more, unless otherwise expressly and specifically defined.

In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described.

The term "comprising," when utilized, means "including, but not necessarily limited to"; it specifically indicates open-ended inclusion or membership in the so-described combination, group, series, and the like.

In order to achieve the purpose, a method for setting parameters is provided by an embodiment of the application comprises:

acquiring historical processing data, pre-processing the historical processing data to obtain sample data; creating a trained regression model using the sample data; obtaining preliminary processing data by using the regression model, the preliminary processing data comprising a preliminary objective parameter and a plurality of preliminary reference parameters; receiving a predetermined objective parameter inputted by a user; adjusting the preliminary objective parameter according to the predetermined objective parameter to obtain an emulated objective parameter, the preliminary reference parameters and the emulated objective parameter cooperatively constituting emulated processing data; training a reinforcement learning algorithm by using the historical processing data and the emulated processing data; obtaining actual reference parameters; determining an actual objective parameter according to the actual reference parameters and the trained reinforcement learning algorithm.

Therefore, the trained regression model is created using the historical processing data, updated processing data is obtained based on the trained regression model. then the reinforcement learning algorithm can be trained by using the historical processing data and the updated processing data, with enlarged scale of the training data, the accuracy of the reinforcement learning algorithm is improved. Therefore, the objective parameter can be determined rapidly by using the predetermined reference parameters and the trained reinforcement learning algorithm. Compared with manual regulations, the method determines the objective parameter rapidly, which takes full advantage of big data and saves the cost of multiple tests.

A detailed description of the hereinafter described embodiments of the disclosure is presented herein by way of exemplification and not limitation with reference to the figures.

The parameter setting method is configured for setting objective parameter of the processing of materials, which processing can be any type of processing, such as welding, etching, chemistry polishing, anodic dyeing, and so on. In following descriptions, the method of setting objective parameter of materials in anodizing tanks for anodic dyeing is described exemplarily. During the process of anodic dyeing, mass processing data is generated, including reference parameters and objective parameter. The reference parameters of the anodizing tank are processing parameters of anodic dyeing, comprising concentration, pH value, and temperature of the anodizing tank; the reference parameters further includes resulting parameters indicates the results of processing of the materials, comprising color value of the processed materials, dyeing results indicate whether the color of the processed material is qualified when compared to a predetermined color value, and the yield rate of the processed materials, such as multiple racks of materials on one flybar, and so on; the objective parameter is a certain parameter set according to the above reference parameters, such a time duration of dyeing.

During the process of anodic dyeing, the reference parameters are generally predetermined, such as temperature or solution concentration, and such predetermined reference parameters have corresponding objective parameter set by users. For example, when the resulting parameters of the processing data of the materials reveal that the result of processing of the materials is not qualifying, the corresponding objective parameter (such as time duration of dyeing) can be determined and the anodizing tank can be reset accordingly to improve the yield rate of subsequent processing and the efficiency of setting objective parameter.

For setting objective parameter of the anodizing tank, the function of setting parameter of the parameter setting method provided by the application can be integrated into an equipment of the anodizing tank directly or can be setup on a client terminal for implementing the method. Further, the method can be implemented on processing equipment of the anodizing tank in form of Software Development Kit (SDK), and the SDK provides interfaces for the processors or other devices to perform functions of parameter setting.

Referring to FIG. 1, a method for setting parameters according to an embodiment of the application comprises:

S101: acquiring historical processing data.

The historical processing data includes a historical objective parameter and a plurality of historical reference parameters, According to an embodiment, the historical processing data may refer to the data directly output by a processing machine an anodizing tank. In further embodiments, the historical processing data are obtained by performing a secondary processing on the data output from the equipment of the anodizing tank, where the secondary processing can be data cleaning, feature extraction, and the like.

The historical processing data from the processed materials comprises historical objective parameter such as time duration of dyeing and historical reference parameters such as pH and temperature of the anodizing tank, yield rate of the dyed materials, and so on. The historical objective parameter and historical reference parameters are known as the process is completed, then a relationship between these parameters can be obtained according to the historical processing data, and the objective parameter in further processing can be predicted by using algorithm.

S102: pre-processing the historical processing data to obtain sample data.

Accuracy of the historical processing data can be improved by the pre-processing way.

According to further embodiments, the pre-processing of the historical processing data comprises selecting the historical processing data by low variance filter, which removes historical processing data with variance lower than a predetermined threshold (that is, features with same value), such data carries little information and has small influence on processing result of materials, therefore removing them can simplify scale of data and improve running speed.

According to further embodiments, the pre-processing of the historical processing data comprises selecting the historical processing data by high correlation filter, which removes historical processing data with collinearity, such data carries similar information, therefore removing such data simplifies data scale and improves running speed.

According to further embodiments, the pre-processing of the historical processing data comprises selecting the historical processing data by F_regression, which removes historical processing data with low correlation with the processing results of the materials.

It should be noted that, in further embodiments, the pre-processing comprises selecting the historical processing data by at least one of low variance filter, high correlation filter, and F_regression, specifically, the character of the historical processing data is determined firstly, such as correlations between the multiple types of historical processing data, then the method of pre-processing can be determined according to the character, such as historical processing data with high correlation coefficients should be processed by high correlation filter.

S103: creating a trained regression model using the sample data.

Specifically, the trained regression model is created by training an algorithm with the sample data, that is, the regression model is created by performing machine learning with the historical processing data.

S104: obtaining preliminary processing data based on the regression model.

The preliminary processing data includes a preliminary objective parameter and a plurality of preliminary reference parameters.

This step generates the preliminary processing data which, when combined with the historical processing data, significantly expands the data for algorithm training, thereby ensuring higher precision of the algorithm. To derive the preliminary processing data from the regression model, one embodiment involves: inputting the historical reference parameters from the historical processing data into the regression model; the algorithm then outputs the preliminary objective parameter, while retaining the historical reference parameters as preliminary reference parameters, then the preliminary emulated objective parameter and the preliminary reference parameters constitute the preliminary emulated processing data.

The regression mode is input with the updated reference parameters for outputting the preliminary objective parameters, and the updated reference parameters can be regarded as the preliminary reference parameters, then the preliminary processing data comprised of the preliminary objective parameters and the preliminary reference parameters is obtained. In alternative embodiments for deriving preliminary processing data from the regression model, new reference parameters may be acquired. The new reference parameters are different from reference parameters of the historical processing data. For example, the new reference parameters and the reference parameters of the historical processing data may originate from the same processing machine of the anodizing tank but be generated at different timestamps, or the new reference parameters may be output by different processing machine of the anodizing tank. The new reference parameters are input into the regression model to obtain the preliminary objective parameters, while the new reference parameters themselves are designated as the preliminary reference parameters. The combination of the preliminary objective parameters and the preliminary reference parameters forms the preliminary processing data.

Furthermore, in order to acquire the preliminary processing data based on the regression model, in some embodiments, the preliminary processing data may be generated by hybridizing the two methods. That is, input the historical reference parameters into the regression model to obtain the first preliminary objective parameters, and the historical reference parameters are designated as the first preliminary reference parameters.

Updated reference parameters are obtained and input into the regression model to obtain a second preliminary objective parameter, the first preliminary reference parameters and the updated reference parameters can be set as the preliminary reference parameters. The first preliminary objective parameters and the second preliminary objective parameters can be set as the preliminary objective parameter, then the preliminary processing data is obtained based on the preliminary objective parameter and the preliminary reference parameters.

In the preliminary processing data, the first preliminary objective parameters are configured to correspond to the first preliminary reference parameters, the second preliminary objective parameters are configured to correspond to the second preliminary reference parameters.

S105: receiving a predetermined objective parameter inputted by a user; adjusting the preliminary objective parameters according to the predetermined objective parameter to obtain emulated objective parameters, the preliminary reference parameters and the emulated objective parameter cooperatively constituting emulated processing data.

Wherein the preliminary objective parameter is a preliminary estimated value obtained from the regression model, which requires adjustment for improving accuracy, then the accuracy of the algorithm trained by these data can be improved.

Figure 2:
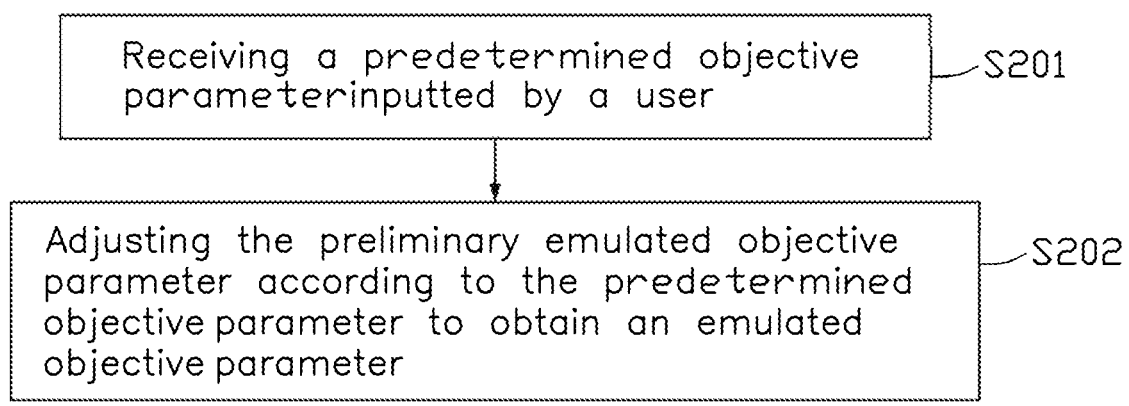
FIG. 2 is a flow diagram of a method of determining emulated objective parameters according to an embodiment of the present disclosure.

In further embodiments, referring to FIG. 2, S105 further comprises:

S201: receiving a predetermined objective parameter inputted by a user;

S202: adjusting the preliminary objective parameter according to the predetermined objective parameter to obtain an emulated objective parameter.

The predetermined objective parameter inputted by the user is a standard objective parameter, which is obtained according to experiences of experts or multiple tests or by debugging. The accuracy of the emulated objective parameter can be improved by combining the predetermined objective parameter inputted by the users and preliminary objective parameters output by the regression model.

Figure 3:
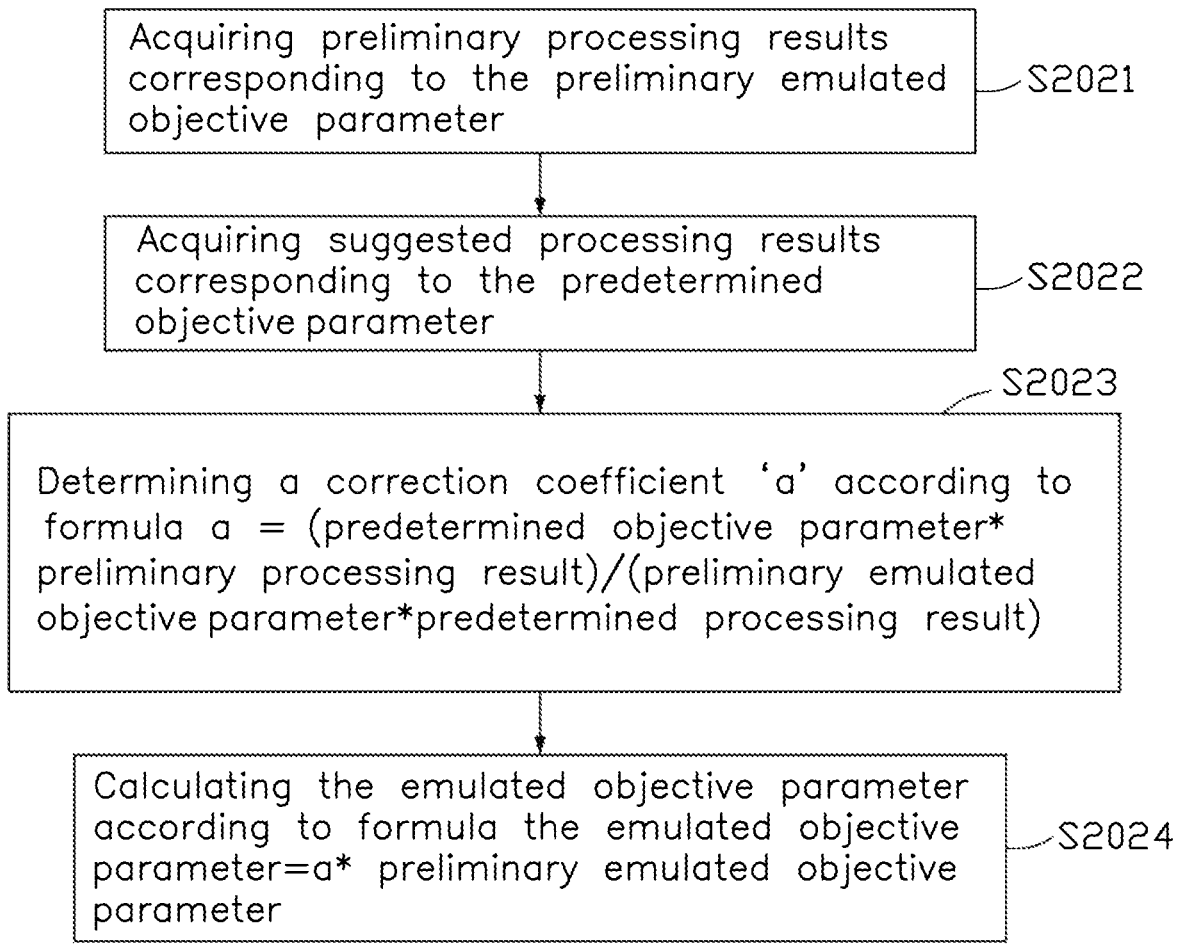
FIG. 3 is a flow diagram of a method of regulating preliminary objective parameters according to an embodiment of the present disclosure.

In further embodiments, referring to FIG. 3, S202 further comprises:

S2021; acquiring preliminary processing results corresponding to the preliminary objective parameter;

S2022: acquiring suggested processing results corresponding to the predetermined objective parameter;

S2023: determining a correction coefficient 'a' according to formula a=(predetermined objective parameter*preliminary processing result)/(preliminary objective parameter*suggested processing result);

S2024; calculating the emulated objective parameter according to formula the emulated objective parameter=a*preliminary objective parameter.

Therefore, the preliminary objective parameters can be modified by t e correction coefficient 'a' (which is the value of difference between the preliminary objective parameter and the predetermined objective parameter) for the emulated objective parameters.

In further embodiments, each regression model outputs sub-objective parameter and each respective weight can be obtained, then the regression models can be ranked by their weights and a certain number of regression algorithms with greater weights can be selected, then the predetermined objective parameter is inputted by the user, and the difference values between the predetermined objective parameter and the sub-objective parameters corresponding to the certain number of regression models can be calculated, and the sub-objective parameter corresponding to the smallest difference value is determined as the preliminary objective parameter.

In further embodiments, each regression model outputs respective sub-objective parameter and probability value, then the regression models can be ranked by their probability values and a certain number of regression models with greater probability values can be selected, then the predetermined objective parameter is inputted by the user, and the difference values between the predetermined objective parameter and the sub-objective parameters corresponding to the certain number of regression models can be calculated, and the sub-objective parameter corresponding to the smallest difference value is determined as the preliminary objective parameter.

The certain number above-mentioned can be selected from 2, 3, or any number over 3.

S106: training a reinforcement learning algorithm by using the historical processing data and the emulated processing data.

Therefore, scale of training data for reinforcement learning process is increased by the emulated processing data, which is formed by adjusting the preliminary processing data obtained from the regression model. The reinforcement learning algorithm can be trained by the historical processing data and the new emulated processing data, and the accuracy of the reinforcement learning algorithm can be improved as the scale of the training data becomes greater.

In further embodiments, each historical reference parameter and emulated reference parameter comprises processing parameters and resulting parameters, wherein the processing parameters comprise setting parameters of the anodizing tank, such as concentration, pH value, and temperature of the dye in the anodizing tank, the resulting parameters comprises processing results of the materials in the anodizing tank, such as color value of the processed materials, whether the color of the processed material is qualified when compared to a predetermined color value, the yield rate of multiple racks of materials on one flybar, and so on. In correlations between the processing parameters, the resulting parameters, and the objective parameter, where two of the three parameters can be determined, the remaining one can also be determined.

According to a further embodiment, the objective parameter is associated with time duration of dyeing, the processing parameters are associated with the temperature and concentration of the dye, which can affect the time duration of dyeing.

Figure 4:
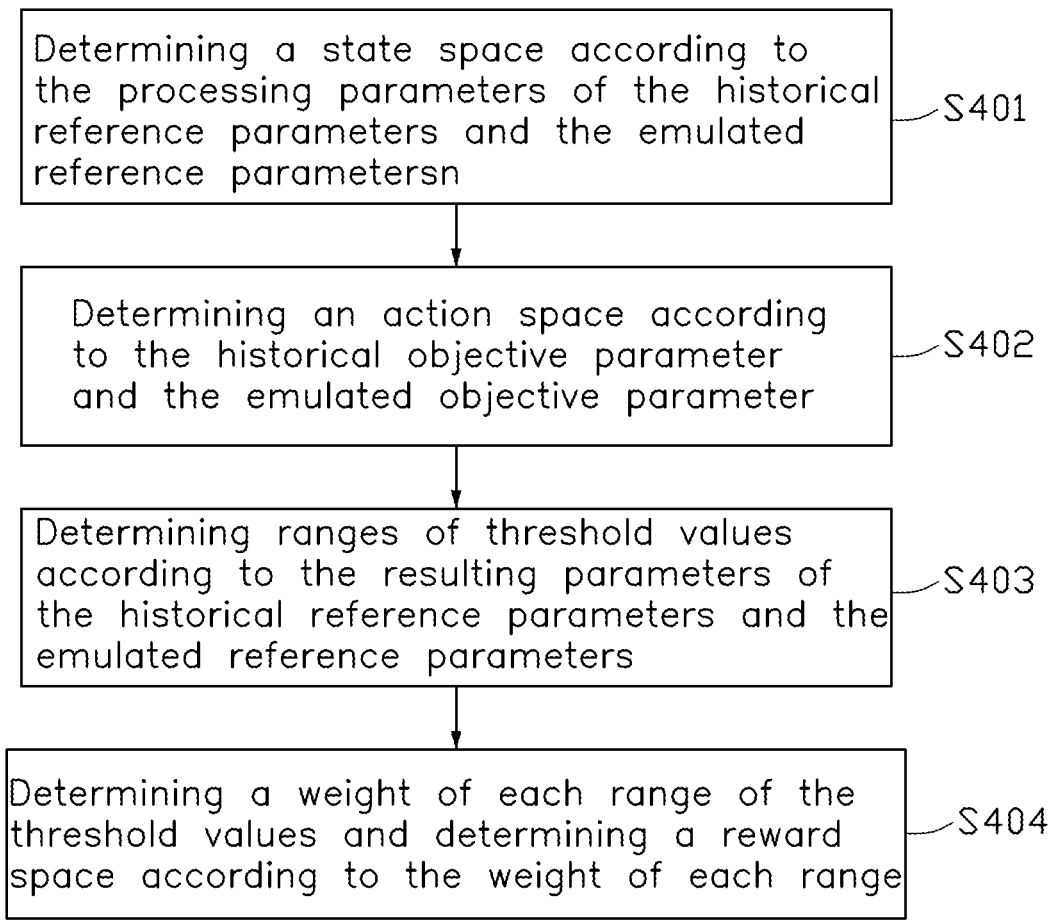
FIG. 4 is a flow diagram of a method of building a reinforcement learning algorithm according to an embodiment of the present disclosure.

Referring to FIG. 4, the method of training the reinforcement learning algorithm comprises:

S401: determining a state space according to the processing parameters of the historical reference parameters and the preliminary reference parameters;

S402: determining an action space according to the historical objective parameter and the emulated objective parameter;

According to an embodiment, a discretized time duration of dyeing is taken as the action space.

S403: determining ranges of threshold values according to the resulting parameters of the historical reference parameters and the preliminary reference parameters;

S404: determining a weight of each range of the threshold values and determining a reward space according to the weight of each range.

Exemplarily, the ranges of threshold values comprise (0, 3), (3, 5), (5, 8), wherein the range of (0, 3) has a weight of 0.2, the range of (3, 5) has a weight of 0.5, and the range of (5, 8) has a weight of 0.3. The range of (3, 5) is for a range that the resulting parameter identifies as qualifying materials, the ranges of (0, 3) and (5, 8) refer to ranges that the resulting parameter identifies as non-qualifying materials. For example, if the resulting parameter is 1, which is outside of the qualifying range of (3, 5) and falls in the non-qualifying range of (0, 3), then the reward should be $(1-3)*0.2=-0.4$, that is, equal to a punishment of 0.4; if the resulting parameter is 4.5, which falls inside the qualifying range of (3, 5), then the reward should be $1/(4.5-(3+5)/2)|*0.5=4$. If the resulting parameter is 7, which is outside of the qualifying range of (3, 5) and falls in the non-qualifying range of (5, 8), then the reward should be $-(7-5)*0.3=-0.6$, that is, equal to a punishment of 0.6. Therefore, the objective parameter can be determined as qualifying or non-qualifying by different threshold value ranges, as the threshold value ranges have different weights, the objective parameter in different ranges can be reward or can be punishment accordingly, and the reward and punishment constitutes the reward space. For example, the resulting parameter 7 gets a more severe punishment than the resulting parameter 1, although they have same difference from the qualifying range, that means, in processing, compared to resulting parameters which are too large, the technique in the art prefers resulting parameters which are smaller.

The reinforcement learning algorithm can be determined according to the state space, the action space, and the reward space.

Therefore, reward/punishment for each objective parameter can be calculated according to the determined state space, action space, and reward space, then different actions can be performed in the action space for bigger reward, and the action with the biggest reward can be determined and regarded as the objective parameter.

According to further embodiments, the reinforcement learning algorithm is an integration of neural networks and Q-learning.

S107: obtaining actual reference parameters.

The actual reference parameters are parameters set and used during the processing of the anodizing tank, that is the aforementioned processing parameters.

S108: determining an actual objective parameter according to the actual reference parameters and the trained reinforcement learning algorithm.

Specifically, the reinforcement learning algorithm is inputted with the actual reference parameters for outputting the objective parameter, which can be set as the actual objective parameter.

Therefore, by creating the trained regression model, the scale of the training data for the reinforcement learning algorithm is increased, and the accuracy of the reinforcement learning algorithm is improved.

The processing data of the equipment of the anodizing tank is unevenly distributed, such as being in several data groups, and if only one regression model is used, the regression model can fail to converge and will output low accuracy results. Therefore, in further embodiments, the method of training the regression model by using the sample data comprises:

Classifying the sample data with an unsupervised clustering algorithm to obtain multiple sub-sample datasets;

Creating a regression model for each sub-sample dataset using a supervised learning process and the data of multiple sub-sample.

The processing data can be clustered into multiple sub-sample datasets according to their distributions, the more clustered processing data is clustered into one cluster, then each of the multiple sub-sample datasets can be used for training a regression model, the accuracy of the trained regression models can be improved as each model deals with only the corresponding cluster of sample datasets.

It should be noted that the unsupervised clustering algorithm is one type of clustering algorithm, in further embodiments, other unsupervised clustering algorithm can be used, such as K-means clustering algorithm, or DBSCAN (Density-Based Spatial Clustering of Applications with Noise) clustering algorithm. Sample data of different types may have overfitting or underfitting problems, and such issue can be overcome by clustering algorithm, further, since sample data of the anodizing tank has a small range of fluctuation and small scale, DBSCAN clustering algorithm can be used for recognizing outliers in the sample data.

The supervised algorithm trains a regression model for each sub-sample dataset, and determines relationship between the reference parameters and the resulting parameters.

Optionally, the regression models can be optimized by the supervised algorithm using a H2O AutoML equipment through automatic feature engineering and Bayesian search.

In further embodiments, the step of acquiring preliminary processing data by the regression model further comprises following steps.

Preliminary reference parameters of the preliminary processing data are obtained and similarities between the preliminary reference parameters and the multiple sub-sample datasets are calculated.

The similarities indicate how similar the preliminary reference parameters and the multiple sub-sample datasets are, which can be obtained by any one of methods such as Minkowski distance, Euclidean Distance, and Chebyshev distance.

The regression models corresponding to the sub-sample datasets are selected according to the similarities.

Specifically, a threshold value of similarities is predetermined, the sub-sample datasets with similarities exceeding the threshold value can be selected. In further embodiments, users can select only the sub-sample dataset with the highest similarities or several sub-sample datasets with relatively high similarities.

Exemplarily, the threshold value of similarity is 0.3, the similarities between the emulated reference parameters and the 5 sub-sample datasets are 0.2, 0.3, 0.5, 0.4, and 0.2. In this case, the regression model corresponding to the sub-sample datasets with similarities of 0.5 and 0.4 can be selected.

The preliminary objective parameter is obtained according to the preliminary reference parameters and the sub-sample datasets, the preliminary objective parameter and the preliminary reference parameters cooperatively constituting the preliminary processing data.

In further embodiments, the historical processing data, the preliminary processing data, and the emulated processing data is associated with anodic dyeing data; the historical reference parameters, the preliminary reference parameters, and the actual reference parameters is associated with anodic dyeing parameter data; the historical objective parameters, the preliminary objective parameters, and the actual objective parameter is associated with duration of dyeing data.

Optionally, the anodic dyeing parameter data comprises concentration of dyeing solution, temperature, pH value, and yield rate of the anodizing tank. It should be noted that, the resulting parameters of the historical reference parameters are existing data, and the resulting parameters of the actual reference parameters can be predetermined. For example, when the resulting data refers to yield rate, the actual objective parameter are output from the reinforcement learning algorithm, the resulting parameters of the actual reference parameters can be predetermined as a yield rate higher than 95%. In further embodiments, after inputting the preliminary reference parameters and the actual reference parameters, instead of inputting the resulting parameters, the algorithm with better resulting parameters can be selected for calculating.

Figure 5:
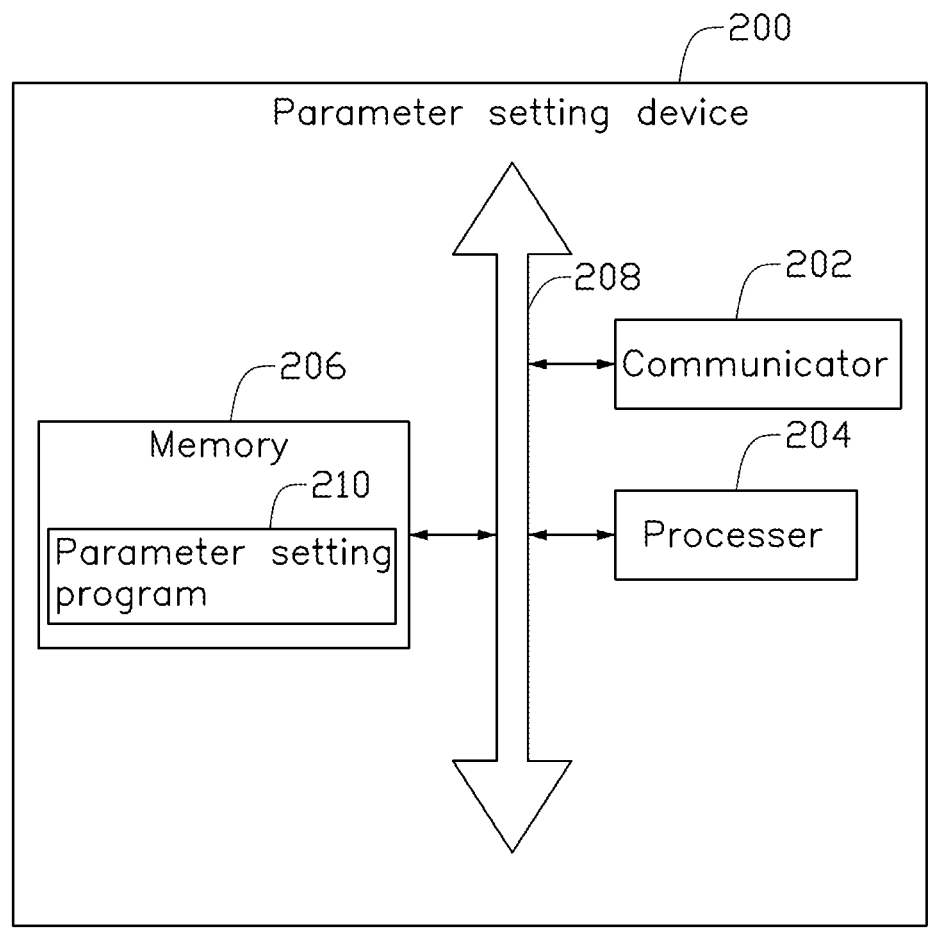
FIG. 5 is a diagram of a hardware architecture of a device for setting parameters according to an embodiment of the present disclosure.

Referring to FIG. 5, a device 200 for setting parameters is provided, it should be understood that the illustration is not to be considered as limiting the scope of the embodiments described herein.

FIG. 5 shows hardware architecture of a device 200 for setting parameters according to an embodiment of the present disclosure, which is configured for determining critical parameters in materials data. The device 200 for setting parameters comprises a communicator 202 and a processor 204 connected with each other for data transmission. In this embodiment, the communicator 202 and the processor 204 are connected by a communication busbar 208.

The communicator 202 is configured for receiving the materials data from the processor 204 or other input device. The communicator 202 can be connected to other parts of the device 200 for setting parameters for data transmission.

The processor 204 can be a Central Processing Unit (CPU), and it can further comprise at least one of following components; other general purpose processor, Digital Signal Processor (DSP), Application Specific Integrated Circuit (ASIC), Field-Programmable Gate Array (FPGA), or other programmable logic devices, such as discrete gate, transistor logic device, and discrete hardware devices. The general purpose processor can be selected from microprocessors or any regular processor. The processor 204 is configured as a control center of the device 200 for setting parameters, and it is connected to other parts of the device 200 for setting parameters via various interfaces and wires.

In further embodiments, the device 200 for setting parameters further comprises a memory 206 connected to the processor 204 by the communication busbar 208. The memory 206 is configured for storing data of the device 200 for setting parameters, such as various database, program code, etc. In this embodiment, the memory 206 comprises but is not limited to Read-Only Memory (ROM), Random Access Memory (RAM), Programmable Read-Only Memory (EPROM), Erasable Programmable Read-Only Memory (EEPROM), Compact Disc Read-Only Memory (CD-ROM), Optical Disc Memory, Disk Memory, Magnetic Tape Memory, or any other computer readable media used for storing or carrying data.

The memory 206 is configured for storing parameter-setting program 210, which program executes steps of the aforementioned method.

Exemplarily, the parameter setting program 210 can be comprised of one or more modules/units, the memory 206 stores the one or more modules/units executable by the processor 204 to perform parameter setting method of the application. The one of more modules/units can be a series of instructions that are capable of performing a specific function, the instruction is used to describe the execution process of the parameter setting program 210 in the device 200 for setting parameters.

According to further embodiments, an electronic device is provided, the electronic device comprises a memory for storing instructions and a processor for calling up instructions to cause the electronic device to perform the aforementioned parameter setting method.

According to further embodiments, a computer readable storage medium is provided for storing the parameter setting program, the parameter setting program is executed by the processor to perform the aforementioned parameter setting method.

While the invention has been described in detail in connection with only a limited number of embodiments, it should be readily understood by the skilled in the art that the invention is not limited to such disclosed embodiments.

Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention May include only some of the described embodiments. Accordingly, the invention is not to be seen as limited by the foregoing description, but is limited only by the scope of the appended claims.

What is claimed is:

1. A parameter setting method for an anodic dyeing process, comprising:
    obtaining actual reference parameters, the actual reference parameters are configured during an anodic dyeing process on material in an anodizing tank;
    determining an actual objective parameter according to the actual reference parameters and a reinforcement learning algorithm; and
    performing the anodic dyeing process on the material in the anodizing tank according to the actual objective parameter, wherein the reinforcement learning algorithm is trained by:
    acquiring historical processing data, the historical processing data comprising a historical objective parameter and a plurality of historical reference parameters;
    pre-processing the historical processing data to obtain sample data;
    creating a trained regression model using the sample data;
    obtaining preliminary processing data based on the regression model, the preliminary processing data comprising a preliminary objective parameter and a plurality of preliminary reference parameters;
    receiving a predetermined objective parameter inputted by a user;
    adjusting the preliminary objective parameter according to the predetermined objective parameter to obtain an emulated objective parameter, comprising: acquiring preliminary processing results corresponding to the preliminary objective parameter: acquiring suggested processing results corresponding to the predetermined objective parameter; determining a correction coefficient 'a' according to formula a=(predetermined objective parameter*preliminary processing result)/(preliminary objective parameter*suggested processing result); and calculating the emulated objective parameter according to formula the emulated objective parameter=a*preliminary objective parameter: the plurality of the preliminary reference parameters and the emulated objective parameter cooperatively constituting emulated processing data;
    training the reinforcement learning algorithm by using the historical processing data and the emulated processing data.

2. The parameter setting method of claim 1, wherein obtaining preliminary processing data based on the regression model further comprises:
    the preliminary objective parameter is obtained according to the regression model and the historical reference parameters, and the historical reference parameters are set as the preliminary reference parameters.

3. The parameter setting method of claim 1, wherein obtaining preliminary processing data based on the regression model further comprises:
    the preliminary objective parameter is obtained according to the regression model and updated reference parameters, the updated reference parameters are set as the preliminary reference parameters.

4. The parameter setting method of claim 1, wherein obtaining preliminary processing data based on the regression model further comprises:
    first preliminary objective parameter is obtained according to the regression model and the historical reference parameters, the historical reference parameters are set as first preliminary reference parameters;
    second preliminary objective parameter is obtained according to the regression model and updated reference parameters, the first preliminary reference parameter and the updated reference parameters are set as the emulated reference parameters, the first preliminary objective parameter and the second preliminary objective parameters are set as the preliminary objective parameters.

5. The parameter setting method of claim 1, wherein the step of creating a trained regression algorithm using the sample data further comprises:
    classifying the sample data according to distribution of the sample data by using an unsupervised clustering algorithm to obtain multiple sub-sample data; and
    creating a regression algorithm for each sub-sample data using a supervised learning process and the multiple sub-sample data.

6. The parameter setting method of claim 1, wherein obtaining preliminary processing data based on the regression model further comprises:
    obtaining the preliminary reference parameters of the preliminary processing data and calculating similarities between the preliminary reference parameters and the multiple sub-sample data by using Euclidean distance algorithm;
    selecting the regression models corresponding to the sub-sample data in response that the sub-sample data with the similarities exceeds a threshold value; and
    obtaining the preliminary objective parameter according to the preliminary reference parameters and the sub-sample data, the preliminary objective parameter and the preliminary reference parameters cooperatively constituting the preliminary processing data.

7. The parameter setting method of claim 1, wherein the pre-processing comprises screening by at least one of a low variance filter, a high correlation filter, and an F_regression.

8. The parameter setting method of claim 1, wherein each of the historical reference parameters and the preliminary reference parameters comprises processing parameters and resulting parameters, training a reinforcement learning algorithm further comprises:
    determining a state space according to the processing parameters of the historical reference parameters and the preliminary reference parameters;
    determining an action space according to the historical objective parameter and the objective parameter;
    determining ranges of threshold values according to the resulting parameters of the historical reference parameters and the preliminary reference parameters;
    determining a weight of each range of the threshold values and determining a reward space according to the weight of each range; and
    determining a trained reinforcement learning algorithm according to the state space, the action space, and the reward space.

9. The parameter setting method of claim 1, wherein the historical processing data, the preliminary processing data, and the emulated processing data are associated with anodic dyeing procedures; the historical reference parameters, the preliminary reference parameters, and the actual reference parameters are parameters associated with the anodic dyeing procedures; the historical objective parameter, the preliminary objective parameter, the emulated objective parameter and the actual objective parameter are associated with time duration of dyeing.

10. The parameter setting method of claim 9, wherein an anodic dyeing parameter data comprises a concentration of dyeing solution, a temperature, a pH value, and a yield rate of the anodizing tank.

11. A device for setting parameters, comprising:
  a communicator configured for acquiring historical processing data, the historical processing data comprising a historical objective parameter and a plurality of historical reference parameters;
  a processor coupling to the communicator, the processor is configured for:
  obtaining actual reference parameters, the actual reference parameters are configured during an anodic dyeing process on material in an anodizing tank;
  determining an actual objective parameter according to the actual reference parameters and a reinforcement learning algorithm; and
  performing the anodic dyeing process on the material in the anodizing tank according to the actual objective parameter, wherein the reinforcement learning algorithm is trained by:
  pre-processing the historical processing data to obtain sample data;
  creating a trained regression algorithm using the sample data;
  obtaining preliminary emulated processing data by using the regression algorithm, the preliminary emulated processing data comprising a preliminary emulated objective parameter and a plurality of emulated reference parameters;
  receiving a predetermined objective parameter inputted by a user;
  adjusting the preliminary emulated objective parameter according to the predetermined objective parameter to obtain an emulated objective parameter, comprising: acquiring preliminary processing results corresponding to the preliminary emulated objective parameter; acquiring suggested processing results corresponding to the predetermined objective parameter; determining a correction coefficient 'a' according to formula a=(predetermined objective parameter*preliminary processing result)/(preliminary emulated objective parameter*suggested processing result); and calculating the emulated objective parameter according to formula the emulated objective parameter=a*preliminary emulated objective parameter; the emulated reference parameters and the emulated objective parameter cooperatively constituting processing data;
  training the reinforcement learning algorithm by using the historical processing data and the emulated processing data.

12. An electronic device, comprising:
  a memory for storing instructions; and
  a processer for calling up the instructions in the memory to cause the electronic device to perform a parameter setting method for an anodic dyeing process, the parameter setting method comprising:
  obtaining actual reference parameters, the actual reference parameters are configured during an anodic dyeing process on material in an anodizing tank;
  determining an actual objective parameter according to the actual reference parameters and a reinforcement learning algorithm; and
  performing the anodic dyeing process on the material in the anodizing tank according to the actual objective parameter, wherein the reinforcement learning algorithm is trained by:
  acquiring historical processing data, the historical processing data comprising a historical objective parameter and a plurality of historical reference parameters;
  pre-processing the historical processing data to obtain sample data;
  creating a trained regression model using the sample data;
  obtaining preliminary processing data based on the regression model, the preliminary processing data comprising a preliminary objective parameter and a plurality of preliminary reference parameters;
  receiving a predetermined objective parameter inputted by a user;
  adjusting the preliminary objective parameter according to the predetermined objective parameter to obtain an emulated objective parameter, comprising: acquiring preliminary processing results corresponding to the preliminary objective parameter: acquiring suggested processing results corresponding to the predetermined objective parameter; determining a correction coefficient 'a' according to formula a=(predetermined objective parameter*preliminary processing result)/(preliminary objective parameter*suggested processing result); and calculating the emulated objective parameter according to formula the emulated objective parameter=a*preliminary objective parameter; the plurality of the preliminary reference parameters and the emulated objective parameter cooperatively constituting emulated processing data;
  training the reinforcement learning algorithm by using the historical processing data and the processing data.

13. The electronic device of claim 12, wherein the step of obtaining preliminary processing data based on the regression model further comprises:
  the preliminary objective parameter is obtained according to the regression model and the historical reference parameters, and the historical reference parameters are set as the preliminary reference parameters.

14. The electronic device of claim 12, wherein the step of obtaining preliminary processing data based on the regression model further comprises:
  the preliminary objective parameter is obtained according to the regression model and updated reference parameters, the updated reference parameters are set as the preliminary reference parameters.

15. The electronic device of claim 12, wherein the step of obtaining preliminary processing data based on the regression model further comprises:
  first preliminary objective parameter is obtained according to the regression model and the historical reference parameters, the historical reference parameters are set as first preliminary reference parameters;
  second preliminary objective parameter is obtained according to the regression model and updated reference parameters, the first preliminary reference parameter and the updated reference parameters are set as the emulated reference parameters, the first preliminary objective parameter and the second preliminary objective parameters are set as the preliminary objective parameters.

16. The electronic device of claim 15, wherein the step of creating a trained regression algorithm using the sample data further comprises:
    classifying the sample data according to distribution of the sample data by using an unsupervised clustering algorithm to obtain multiple sub-sample data; and
    creating a regression algorithm for each sub-sample dataset using a supervised learning process and the multiple sub-sample data.

17. The electronic device of claim 12, wherein the step of obtaining preliminary processing data based on the regression model further comprises:
    obtaining the preliminary reference parameters of the preliminary processing data and calculating similarities between the preliminary reference parameters and the multiple sub-sample data by using Euclidean distance algorithm;
    selecting the regression models corresponding to the sub-sample data in response that the sub-sample data with the similarities exceeds a threshold value; and
    obtaining the preliminary objective parameter according to the preliminary reference parameters and the sub-sample data, the preliminary objective parameter and the preliminary reference parameters cooperatively constituting the preliminary processing data.

18. The electronic device of claim 12, wherein the preprocessing comprises screening by at least one of a low variance filter, a high correlation filter, and an F_regression.

* * * * *